April 6, 1943.    M. J. THOMPSON    2,315,748
METHOD OF AND APPARATUS FOR TAKING AN IMPRESSION
OF A CAVITY FOR DENTAL INLAY
Filed Nov. 21, 1939    2 Sheets-Sheet 1
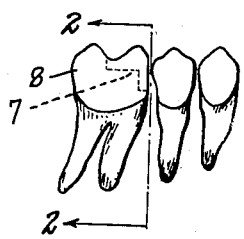
Fig. 1.
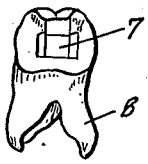
Fig. 2.
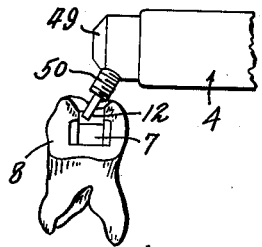
Fig. 3.
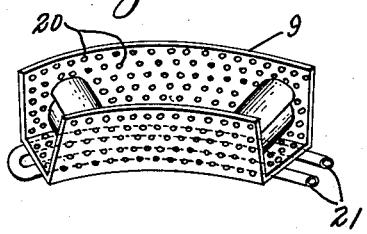
Fig. 4.
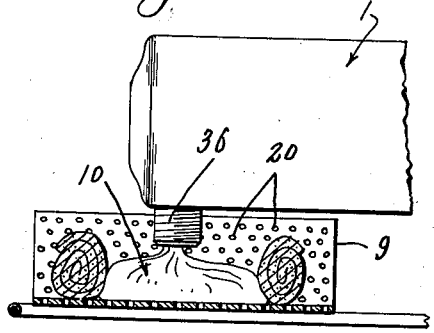
Fig. 5.
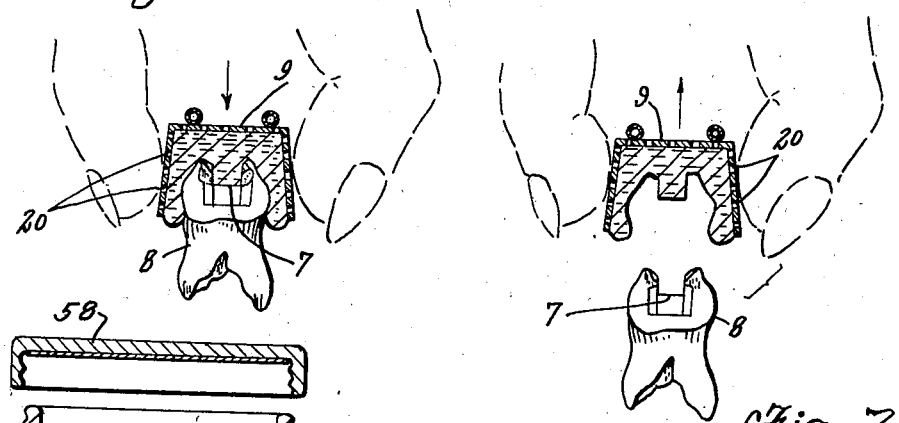
Fig. 6.
Fig. 7.
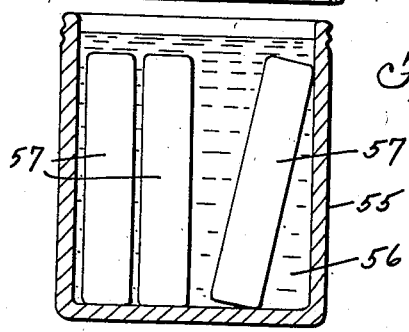
Fig. 12.
Inventor
Morris J. Thompson
By Lyon & Lyon
Attorneys April 6, 1943.   M. J. THOMPSON   2,315,748
METHOD OF AND APPARATUS FOR TAKING AN IMPRESSION
OF A CAVITY FOR DENTAL INLAY
Filed Nov. 21, 1939   2 Sheets-Sheet 2

Inventor
Morris J. Thompson
By Lyon & Lyon
Attorneys

Patented Apr. 6, 1943

2,315,748

UNITED STATES PATENT OFFICE 2,315,748

METHOD OF AND APPARATUS FOR TAKING IMPRESSIONS OF CAVITIES FOR DENTAL INLAYS

Morris J. Thompson, Los Angeles, Calif.

Application November 21, 1939, Serial No. 305,488

4 Claims. (Cl. 32—17)

This invention relates to a method of and apparatus for taking an impression of a cavity for dental inlay, and is more particularly related to a method and apparatus for utilizing a hydrocolloid in the making of a dental inlay to facilitate the operation and to minimize the inaccuracies.

Hydrocolloids as used in dentistry are preparations made for obtaining impressions. These hydrocolloids, of which there are several, are reversible colloids generally including agar, water, chemical substances and some form of material to give body to the said preparations. Among the dental colloids is that hydrocolloid described in the patents to Harrison Nos. 2,021,058 and 2,021,- 059, issued November 12, 1935, and 2,089,552, issued August 10, 1937. This particular colloid is sold under the trade name of "Surgident." Other hydrocolloids are on the market, for example, under the name of "Dentocoll." A characteristic of these hydrocolloids is that they are rendered fluid or in a "sol" condition below the boiling point of water and that they "gel" at temperatures just above body temperature. Although these colloids are only rendered fluid at temperatures near the boiling point, they will retain their fluidity sufficiently at reduced temperatures to permit most efficient use. Another characteristic of these hydrocolloids is that they tend to disintegrate or granulate upon being rendered fluid and require mixing in order to be maintained homogeneous and suitable for use in the making of accurate impressions, particularly where they are maintained in the fluid condition over periods of time. Thus in the fluid condition these colloids lose a certain amount of their smoothness, tend to granulate and become coarse, showing a tendency to disintegrate in the fluid condition which renders the same less efficacious in the making of accurate impressions. The reduced temperatures at which these hydrocolloids may be maintained sufficiently fluid for most efficient use, depends upon their composition. For "Surgident" in the specific example hereinafter used in explaining my invention, this temperature is approximately 150–160° F. Another well recognized characteristic of these hydrocolloids is that they require working, or kneading, before they are in condition for use.

It is an object of my invention to provide a method of utilizing such hydrocolloids in the preparation of inlays for dental cavities, either such inlays as may be utilized for dental filling or for bridge or other dental restorations.

Another object of my invention is to provide a method of utilizing hydrocolloids in the preparation of impressions for the production of inlays wherein the hydrocolloids are conditioned through the proper maintenance of a temperature control of said hydrocolloids and wherein the patient in whose mouth the impression is being made is not subjected to the higher temperature effects of the hydrocolloid in its completely fluid state.

Another object of this invention is to provide a method of taking cavity impressions in the mouth of a patient, including the steps of introducing the hydrocolloid into the cavity in the relatively small quantity required for taking the impression in the cavity and utilizing a second portion of hydrocolloid at a lesser temperature and in a condition of semi-fluidity for forcing the fluid hydrocolloid into the crevices and against the surfaces of the cavity and in such manner that the semi-fluid portion of the hydrocolloid bonds with the fluid portion of hydrocolloid and wherein upon subsequent cooling of the hydrocolloid the entire impression of the cavity may be withdrawn with the portion of hydrocolloid which was utilized and was of a lesser degree of fluidity.

Another object of this invention is to provide a method of making impressions of a cavity in a tooth wherein a hydrocolloid is utilized in fluid condition and wherein said hydrocolloid is injected into the cavity through the use of a syringe which provides for mixing of said hydrocolloid as introduced into the cavity and wherein the impression is completed through the use of a second quantity of hydrocolloid carried in a suitable tray and adapted to be pressed over the tooth to force the semi-fluid hydrocolloid carried thereby against the fluid hydrocolloid to insure that the fluid hydrocolloid will be forced into all crevices and against all surfaces of the dental cavity and wherein the second portion of the hydrocolloid enables the taking of an impression of the exterior surfaces of the said tooth, its contour and relation to adjacent teeth at the time of the taking of the dental cavity impression and wherein after subsequent cooling, the entire impression as thus obtained may be removed as a unit with the tray.

Another object of this invention is to provide apparatus for the effective handling of the hydrocolloids as used in the making of such dental impressions wherein the hydrocolloid is maintained in condition for use.

Another object of this invention is to provide a method of handling and dispensing hydrocolloids wherein the hydrocolloids are maintained against the tendency of the same to deteriorate.

Another object of this invention is to provide apparatus for the dispensing of hydrocolloids in the form applicable for use in the making of dental impressions of a cavity or the like wherein the hydrocolloids are maintained in chemical solution of substantially isotonic character so that chemical migration in the colloids is prevented or reduced.

Another object of this invention is to provide a method of making an impression of a cavity for dental inlay or filling including the making of an impression of the cavity with a hydrocolloid with the subsequent maintenance of the impression as obtained in a solution of an isotonic character to prevent the change of dimensions of the impression prior to the making of a mold therefrom.

Other objects and advantages of this invention it is believed will be apparent from the following detailed description of a preferred embodiment thereof as the same is set forth particularly with reference to that hydrocolloid sold under the name of "Surgident." Such materials are described, for example, in Letters Patent No. 2,089,552, issued August 10, 1937, and Letters Patent No. 2,021,059, issued November 11, 1935. It is, however, contemplated that my invention is equally applicable to other hydrocolloids with substantially equal facility and accuracy as the same are found upon the market.

The preferred embodiment of my invention is herein set forth in connection with the apparatus as shown in the accompanying drawings:

Figure 1 is a view of teeth illustrating a dental cavity in one of the teeth prepared to receive an inlay.

Figure 2 is a view looking into the cavity of the tooth shown in Figure 1 and taken substantially on the line 2—2 of Figure 1.

Figure 3 is a view similar to Figure 2 illustrating diagrammatically the operation of injecting a hydrocolloid from a mixing syringe into the prepared cavity.

Figure 4 is a perspective view of a tray as utilized for carrying a second portion of a hydrocolloid.

Figure 5 is a view illustrating the operation of filling the tray with hydrocolloid from a mixing syringe.

Figure 6 is a diagrammatic view illustrating the operating of positioning the tray and semi-fluid hydrocolloid in position with relation to Figure 4 to force the fluid hydrocolloid into all angles and against all surfaces of the cavity and over the exterior contour of the teeth so that a dual impression of the tooth cavity and of the contour of the tooth and adjacent teeth is obtained.

Figure 7 is a diagrammatic view illustrating the operation of removing the impression by withdrawing the tray.

Figure 12 is a sectional elevation of a hydrocolloid dispensing package embodying my invention.

Figure 8:
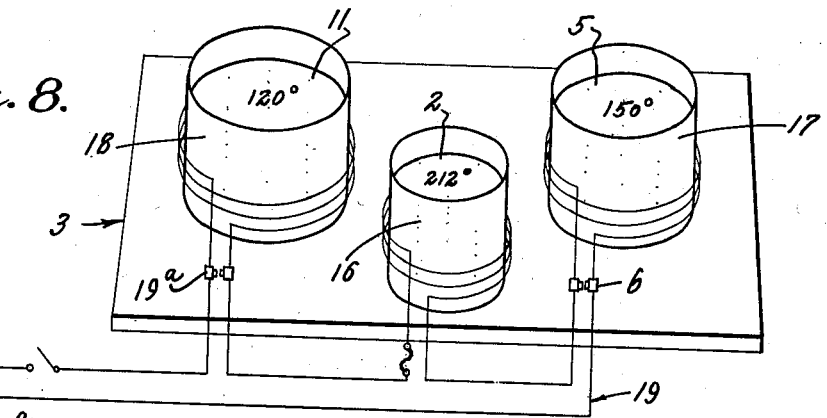
Figure 8 is a diagrammatic view of the apparatus utilized for conditioning the hydrocolloid portions prior to use.
Figure 9:
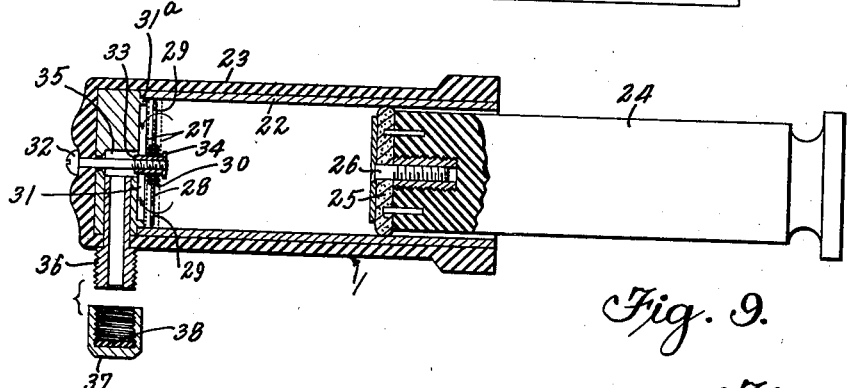
Figure 9 is a side elevation partly in vertical section of the mixing syringe as utilized for the conditioning of a hydrocolloid and for maintaining the same in condition and at the temperature suitable for filling the said tray.

In accordance with my invention, the hydrocolloid, for example, Surgident, is conditioned to insure that the same is entirely homogeneous. To condition the hydrocolloid it is placed in the conditioning apparatus. The hydrocolloid is first rendered fluid by placing a stick thereof in a suitable container, for example, the large mixing syringe 1, and placing this syringe into the boiling water compartment 2 of the temperature control means 3. It is allowed to remain in the boiling water for a period of 8 to 12 minutes. The syringe of fluid hydrocolloid is then withdrawn from the boiling water and then immersed in the second compartment 5 of the temperature control apparatus 3. Here the hydrocolloid is maintained fluid at a temperature of between 150 to 160° F., limited by the thermostatic control means 6 with the heating element of the bath 5. Thus the hydrocolloid is maintained in condition for instant use. The dental cavity 7 is prepared in the tooth 8, and when this cavity is prepared, the tray 9 is filled as illustrated at 10 with the hydrocolloid from the large syringe 1.

The operation of forcing the hydrocolloid from the large syringe 1 results in the mixing of the said hydrocolloid to insure that the same is homogeneous when placed in the tray 9. The tray 9 is then placed in the third bath 11 of the temperature control apparatus 3, which bath is maintained at a temperature at which the hydrocolloid is maintained in a semi-fluid condition which, with the hydrocolloid Surgident, is approximately 120° F. The tray 9 containing the colloid is allowed to remain in this temperature control bath until it has reached the temperature of the bath.

The bath 11 is preferably a bath of a solution I prefer to refer to as an isotonic solution, that is, one having substantially the same concentration of chemical reagents as are present within the hydrocolloid so that migration of the chemicals from the hydrocolloids into the bath does not take place at the expense of the hydrocolloid. Thus the bath 11 is an approximate 2½% solution of potassium sulphate which is the chemical contained in the hydrocolloid Surgident for the purpose of accelerating the set of the plaster of Paris mold subsequently to be produced from the impression made.

The cavity 7 at this stage is filled with the hydrocolloid by forcing the same through the filling needle 12 of the small syringe 4 in which the hydrocolloid is in substantially fluid condition and is at the temperature at which fluidity is maintained in the case of the hydrocolloid, Surgident, at approximately 150° F. Immediately upon injecting a sufficient quantity of fluid hydrocolloid into the cavity 7 to make the impression, the small syringe 4 is set aside and the tray 9 containing the semi-fluid hydrocolloid is withdrawn from the bath 11, the solution wiped therefrom, and the same is positioned over the tooth 8 and forced down thereover and against the exterior surface of the tooth 8 so that the still fluid hydrocolloid in the cavity 7 is forced by the semi-fluid hydrocolloid into the cavity and against all wall surfaces of the cavity 7 and so that the semi-fluid hydrocolloid is at the same time forced against all exterior surfaces of the tooth 8 and preferably over the surfaces of the tooth adjacent to the tooth 8 in the mouth of the patient so as to give an impression of this tooth region.

The semi-fluid hydrocolloid is at approximately 120° F. and this is not an uncomfortable temperature for application of the hydrocolloid to the gums and tissues of the mouth so that it causes no distress to the patient. This operation results in the bonding of the semi-fluid hydrocolloid contained in the tray 9 with the fluid hydrocolloid in the cavity 7. The colloid is then immediately cooled by spraying water over the tray 9 until the impression has set or jellied. The entire impression, including that of the exterior of the tooth 8 and adjacent teeth and the cavity 7 is then withdrawn by raising the tray 9 away from the tooth 8. The hydrocolloid is of such character that the same will be withdrawn from all undercut surfaces of the exterior of the tooth 8 or adjacent teeth or spaces between the teeth and the impression as formed will then return to the original shape and dimensions.

The tray 9 containing the impression is then placed in the conditioning bath 13, which conditioning bath 13 is preferably an isotonic solution again, in the case of Surgident, of approximately 2½% solution of potassium sulphate. This maintains the impression from dimension changes until the proper mold may be cast therefrom. It prevents chemical change of the hydrocolloid and again prevents chemical interchange between the solution and the hydrocolloid to the detriment of the hydrocolloid.

At a convenient later time the impression may be poured from any desired or suitable plaster stone by pouring the same into the impression in the tray 9 as illustrated at 14. The plaster stone, and the impression, is preferably again immersed in the isotonic solution contained in the conditioning bath 13 until the same has hardened sufficiently for handling. It will thus be obvious that before the stone is poured into the impression contained in the tray 9, the solution is expelled from the surface of the impression by suitable means such as by blasts of compressed air. However, the surface of the impression should not be entirely denuded of moisture, as a dry surface is apt to result in shrinkage and dimensional change of the impression.

The temperature conditioning bath embodied in my invention consists of the control means 3 and contains three separate bath containers 16, 17 and 18. Means are provided, as illustrated at 19, for heating water or solution in each of the said containers 16, 17 and 18. The heating means for the container 16 is such as to maintain the bath 2 therein at approximately boiling temperatures. The heating element for the container 17 includes the thermostatic control element 6 wherein the bath 5 is maintained at approximately 150° F.

The heating element for the container 18 is such as to maintain the bath of isotonic solution 11 at approximately 120° F. and includes a thermostatic element 18a.

The tray 9 is formed of easily pliable metal such, for example, as sheet aluminum perforated as indicated at 20 preferably over its entire surface. Aluminum, or easily pliable material, is employed for the tray 9 so that the same may be contoured easily to fit the case in hand and also because it is particularly advantageous in transmitting the heat away from the colloid on cooling to congeal the same. The tray may be cooled either by having attached to the tray metal tubing as indicated at 21 through which water may be circulated, or by flooding the tray with cold water through the use of an ordinary dental syringe.

The large syringe 1 is preferably of the following construction and includes a cylinder 22 which is covered on its exterior surface with a rubber sleeve 23 which aids in the maintenance of the required temperature of the colloid within the cylinder 22 by reducing the heat transfer and also enables the dentist to grasp the same without danger of burning his fingers.

Mounted in the cylinder 22 is a plunger 24 which may be of any suitable or desirable construction but is herein illustrated as including a rubber head 25 secured thereto by any suitable securing and adjusting means 26.

Mounted at the discharge end of the cylinder 22 is a mixing unit through which the hydrocolloid is forced by advancing the plunger 24 into the cylinder 22. The mixing unit includes screen discs 27 between which there is mounted a mixing disc 28 having a plurality of mixing apertures 29. The screen discs 27 and disc 28 are held in spaced relation by means of washers 30 and the unit is assembled within the cylinder over the discharge chamber 31 by means of a screw 32 which is threaded within the ferrule 33 which is passed axially through the discs 27, 28 and washers 30 and is provided with a head 34.

The screen discs 27 and 28 are of a diameter to fit within the cylinder 22 and are held with relation to the chamber 31 by means of a shoulder 31a. The chamber is in communication with the discharge port 35 which is angulated and in one angled section of which there is mounted a discharge nozzle 36 normally provided with a cap 37 having a rubber washer 38 mounted to close the end of the nozzle 36.

The action of forcing the hydrocolloid from the cylinder 22 is: The hydrocolloid is first forced through the first screen 27 over the area of the screen. The hydrocolloid then passes in a direction to find its way through the mixing apertures 29 and then passes out through the second screen 27 into the mixing chamber 31. The hydrocolloid then is again turned in its direction of travel as it passes into the discharge port 35 in the cylinder head and then turns again in passing into the bore of the discharge nozzle 36. Thus the hydrocolloid is not only forced through the screens 27 to divide the same, but is caused to pass through a circuitous path of angled form before it is discharged from the nozzle 36. This mixes the hydrocolloid so that it issues as a uniform mixture.

The screens 27 are preferably rather fine screens, being in the neighborhood of 675 mesh screens. The screens also provide restricted apertures so that in passing therethrough, the hydrocolloid is finely divided and thereafter remixed.

The syringe is made of such diameter as to receive the portions of the sticks of hydrocolloid Surgident, that is, the diameter is such as to receive without modification portions of the sticks as made.

Figure 11:
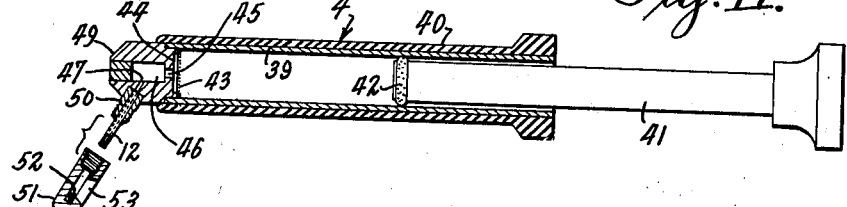
Figure 11 is a side elevation partly in vertical section of the mixing syringe as utilized for injection of the fluid hydrocolloid into the tooth cavity.
Figure 10:
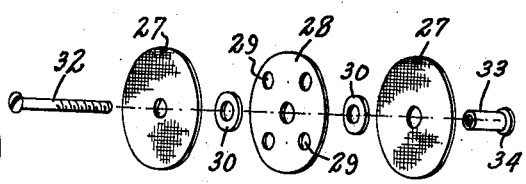
Figure 10 is an exploded perspective view of a mixing means embodied in the syringe of Figure 9.
Figure 13:
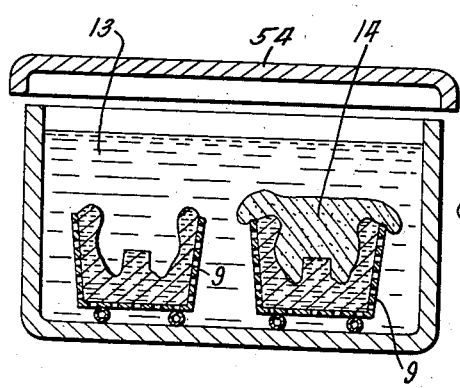
Figure 13 is a sectional elevation of apparatus utilized for maintaining the impression and the mold cast therefrom.

The small syringe 4 of Figure 11 is formed of a cylinder 39 which is likewise provided with a rubber enclosing sleeve 40. A plunger 41 having a rubber plunger head 42 is mounted in the cylinder 39. A single mixing screen 43, or a mixing unit similar to that described in connection with the large syringe 1, is mounted in the discharge end of the cylinder 39 over the discharge chamber 44. The discharge chamber 44 discharges through a restricted aperture 45 into an enlarged chamber 46 which in turn discharges through a restricted passage 47. The restricted passage 47 discharges into the bore of the discharge needle 12 which is held in the head 49 of the cylinder 39 by means of an adapter 50. A cap 51 is adapted to be threaded to the adapter 50 and is provided with a rubber closure member 52 which is adapted to engage the end of the needle 12 to seal the same and prevent water from passing into the cylinder 39 when the said syringe is positioned within the heating water or solution. The cap 51 is provided with a cleaning opening 53 so that it may be cleaned.

As in the case of the large syringe 1, the hydrocolloid is mixed as it is forced from the cylinder 39 through the screen 43 into the mixing chamber 44 and passes through the alternately restricted and enlarged mixing chambers provided in the head 49 and through the angled path of discharge.

The needle 48 is a small needle and may be of the type used as hypodermic needles of from 10 to 20 gauge. The hydrocolloid is maintained in this syringe in approximately 150° F. and is completely mixed before it is delivered into the cavity 7 of the tooth 8. The use of the rubber sleeve 40 protects not only the hands of the dentist utilizing the syringe, but also protects the patient from direct contact with the relatively hot cylinder. The rubber sleeve being a poor conductor of heat from within, protects the hydrocolloid from cooling too rapidly.

The conditioning bath 13 is merely a suitable container for the isotonic solution, that is, a chemical solution approximating the chemical constituents of the hydrocolloid and is provided with a cover 54 to prevent evaporation and consequent concentration change.

In accordance with my invention, the hydrocolloid as utilized is dispensed and maintained in condition in a new and novel manner. The hydrocolloids as they are usually supplied upon the market are contained within casings as, for example, in the case of Surgident, in a casing of the character as described in the Van Rossem Patent No. 2,108,953 issued February 22, 1938.

In accordance with my invention, containers of this character are eliminated and the hydrocolloid is dispensed in a suitable container 55 which may be glass or other suitable material in which there is maintained a solution indicated at 56 which is a substantially isotonic solution in that it contains the chemical agent of the hydrocolloid so that migratory interchange of the chemical in the colloid in the water does not occur to the detriment of the hydrocolloid. Thus in the case of Surgident, potassium sulphate is present in the hydrocolloid to the extent of approximately 2½%. This potassium sulphate is present to provide an accelerator for accelerating the set of the plaster of Paris or plaster stone utilized.

I have found that the use of the expensive form of containers as, for example, described in the Van Rossen patent hereinabove set forth may be eliminated and the hydrocolloids kept without deterioration in a solution which I have termed an isotonic solution because it is a chemical solution having approximately the same concentration of chemical as that contained in the hydrocolloid. Thus the solution as illustrated would be approximately a 2½% solution of potassium sulphate into which the sticks 57 of hydrocolloid are immersed.

A cover 58 is provided for sealing the container 55 to prevent spilling of the solution or evaporation thereof. The sticks 57 of hydrocolloid may be of such diameter and shape as to fit the bore of the cylinders of the syringes 1 and 4. Thus the larger sticks may be dispensed in one solution containing cylinder 55 and the smaller sticks adapted to fit the smaller syringe 4 may be contained in a container 48 likewise containing the so-called isotonic solution and maintained therein without danger of deterioration. This enables me to supply the dentist the material in the condition where it is applicable for use and also at the same time to dispense to the dentist the chemical solution required for the proper maintenance of the hydrocolloid impressions after they are formed as, for example, in the conditioning bath 13.

Having fully described my invention, it is to be understood that I do not wish to be limited to the details herein set forth, but my invention is of the full scope of the appended claims.

I claim:

1. A method of taking an impression of a tooth cavity including the steps of injecting in the said cavity a first portion of hydrocolloid heated to fluidity, and then forcing a second portion of hydrocolloid in a tray over the tooth to position the second portion of hydrocolloid in contact with the said fluid hydrocolloid, the second portion of hydrocolloid being at a lower temperature than the portion injected into the tooth cavity, forcing the second portion of hydrocolloid against the first portion of the hydrocolloid and against the tooth surfaces to cause the first portion of hydrocolloid to be forced into all crevices and against all cavity surfaces, cooling the said hydrocolloid portions, and then removing together the bonded hydrocolloid portions with the said tray.

2. In a method of taking an impression of a tooth cavity, including the steps of preparing a hydrocolloid for said impression by heating the same to a fluid state, tempering a first portion of said hydrocolloid at a temperature in the range of 150° to 160° F., tempering a second portion of said hydrocolloid at a temperature of the order of 120° F., injecting the first portion into the cavity, and then utilizing the second portion to force the first portion into conformity within the said cavity.

3. A method of taking an impression of a tooth cavity, including the steps of separately tempering portions of hydrocolloid, the first portion being heated to a higher temperature than the second portion, injecting the first portion into the cavity, positioning the second portion in a carrier, forcing the carrier and second portion over the tooth to contact the first portion with the second portion and to thereby force the first portion into the crevices and against the walls of said cavity, allowing the two portions of hydrocolloid to set and bond, and then removing the carrier together with the two portions of hydrocolloid.

4. A method of taking an impression of a tooth cavity including the steps of dividing a hydrocolloid into two portions the first of which portions is heated to fluidity, and the second of which portions is partially congealed, injecting into the said cavity the first portion of hydrocolloid, and then forcing the said first portion of hydrocolloid into all crevices against all surfaces of the said cavity, before said first portion is congealed, by means of the second portion of hydrocolloid, to form an impression and while the second portion of the hydrocolloid is of sufficient fluidity to bond to the said first portion, cooling the said hydrocolloid portions, and then removing together the bonded hydrocolloid portions.

MORRIS J. THOMPSON.